(12) United States Patent
White, III et al.

(10) Patent No.: US 7,206,882 B2
(45) Date of Patent: Apr. 17, 2007

(54) TRIGGERED COMMUNICATION NETWORK FOR CANOPEN NETWORKS

(75) Inventors: William A. White, III, Carlisle, MA (US); Lawrence W. Hill, North Eastham, MA (US); James McLean, York, ME (US); William D. Sparks, Litchfield, NH (US); Jean Francis Rolland, Rueil-Malmaison (FR)

(73) Assignee: Schneider Automation Inc., North Andover, MA (US)

( * ) Notice: Subject to any disclaimer, the term of this patent is extended or adjusted under 35 U.S.C. 154(b) by 503 days.

(21) Appl. No.: 10/045,517

(22) Filed: Oct. 26, 2001

(65) Prior Publication Data

US 2003/0084207 A1 May 1, 2003

(51) Int. Cl.
*G06F 3/00* (2006.01)

(52) U.S. Cl. .......................... 710/110; 710/36; 710/305
(58) Field of Classification Search ................ 710/36, 710/107, 110, 113, 305, 300
See application file for complete search history.

(56) References Cited

U.S. PATENT DOCUMENTS

| | | | |
|---|---|---|---|
| 4,887,262 A | 12/1989 | Van Veldhuizen | |
| 5,061,916 A | 10/1991 | French et al. | |
| 5,537,549 A * | 7/1996 | Gee et al. | 709/224 |
| 5,551,053 A | 8/1996 | Nadolski et al. | |
| 5,553,308 A * | 9/1996 | Vink | 710/33 |
| 5,555,548 A * | 9/1996 | Iwai et al. | 709/208 |
| 5,675,830 A | 10/1997 | Satula | |
| 5,802,061 A * | 9/1998 | Agarwal | 370/461 |
| 5,828,672 A | 10/1998 | Labonte et al. | 714/708 |
| 5,835,507 A | 11/1998 | Huang et al. | 714/748 |
| 5,982,828 A | 11/1999 | Fujimori et al. | |
| 6,111,888 A | 8/2000 | Green et al. | |
| 6,145,008 A | 11/2000 | Kopetz | |
| 6,212,569 B1 | 4/2001 | Cashman et al. | 709/236 |

FOREIGN PATENT DOCUMENTS

| | | |
|---|---|---|
| DE | 37 19283 A1 | 12/1988 |
| EP | 1 107 500 A2 | 6/2001 |
| EP | 1 107 500 A3 | 6/2001 |

OTHER PUBLICATIONS

Florian Hartwich, Bernd Müller, Thomas Führer and Robert Hugel, "CAN Network with Time Triggered Communication" [online] [retrieved on Jan. 28, 2002]. Document retrieved from the Internet at the hypertext link "CAN Network with Time Triggered Communication" at <URL: http://www.can.bosch.com/content/TT_CAN.html.

Thomas Führer, Bernd Müller, Werner Dieterle, Florian Hartwich, Robert Hugel and Michael Walther, "Time Trigger Communication on CAN (Time Triggered CAN–TTCAN)" [online], 2000 [retrieved on Jan. 28, 2002]. Document retrieved from the Internet at the hypertext link "Time Triggered Communication on CAN" at <URL: http://www.can.bosch.com/content/TT_CAN.html.

Tran, Eushiuan, Multi–Bit Error Vulnerabilities in the Controller Area Network Protocol, Doctoral Thesis, Carnegie Mellon University, Pittsburgh, PA, May 1999.

(Continued)

*Primary Examiner*—Fritz Fleming
*Assistant Examiner*—Harold Kim

(57) ABSTRACT

A CANOpen network including a bus master and an I/O module is disclosed. Each is communicatively coupled to a common bus. The I/O module is subject to a state change. The bus master collects state information from the I/O module by determining if the bus master is prepared to receive further data from the bus and sending a trigger signal from the bus master to the I/O module if the bus master is prepared to receive further data from the bus. The I/O modules sends a state signal to the bus master in response to the trigger signal.

12 Claims, 1 Drawing Sheet

OTHER PUBLICATIONS

Charzinski, Joachim: Performance of the Error Detection Mechanisms in CAN, Proceedings of the 1$^{st}$ International Conference, Mainz, Germany, Sep. 1944, pp. 120–129.

OPTO 22 Search Database [online], [retrieved on Feb. 9, 2001] *Retrieved from Products—Product View using Internet*<URL:http://www.opto22.com/Ordering/Product-DrillDown.asp?IK=105>.

OPTO 22 Data Sheet, Form 1076–010123, 349 Software FactoryFloor, pp. 1–10.

OPTO 22 Data Sheet, Form 1083–010124, BRAINS Snap Ethernet, pp. 1–7.

"SNAP Ethernet Brain User's Guide," OPTO 22, Feb., 2001, pp. 1–136.

"SNAP Ethernet Brain Programming Guide," OPTO 22, Feb., 2001, pp. 1–128.

OPTO 22, White Paper: Ethernet an TCP/IP for IA—Understanding and Evaluating Ethernet and TCP/IP Technologies for Industrial Automation, Copyright 2000, pp. 1–4.

Opto 22 Application Note, "Using XML Files on a SNAP Ethernet I/O System," pp. 1–3.

"Opto 22 SNAP Ethernet I/O Frequently Asked Questions (FAQ)," Revised Jan. 28, 2000, pp. 1–13.

Opto 22 Product Guide, SNAP I/O Control System, pp. 1 through 9.

Opto 22—Home Page [online], [retrieved on Nov. 16, 2002] Retrieved using Internet <URL:http://www.opto22.com>.

Communication from the European Patent Office including International Search Report from WO 03/067804, mailed Jun. 17, 2003.

Kubota, Y. et al., NTT Human Interface Laboratories, "Proposal of the Robot System With Information Sending Mechanism," Presented at the 14$^{th}$ Annual Conference of the Robotics Society of Japan, Nov. 1–3, 1996, pp. 341–342. (In Japanese w/ English translation included).

Picon, Gerard, Schneider Automation, "Java and Programmable Automation Controllers," *CiMax: Edition Terrain*, No. 13 –May/Jun. 1997 (in French w/ English translation included).

Brugger, Peter, "Web Technology in Embedded Computing," *Industrial Computer 97 –Special Edition*: Sep. 3, 1997 (in German w/ English translation included).

Williams, Tom, et al., "Java Goes to Work Controlling Networked Embedded Systems," *Computer Design*, Aug. 1996, p. 36.

Fu, K.S. et al., *Robotics: Control, Sensing, Vision and Intelligence*, Chapter Five: Control of Robot Manipulators: Sections 5.1 –5.3.1.

*Automation Strategies*, by Automation Research Corporation, Feb. 1998, pp. 1–32.

* cited by examiner

TRIGGERED COMMUNICATION NETWORK FOR CANOPEN NETWORKS

RELATED APPLICATIONS

None.

FEDERALLY SPONSORED RESEARCH OR DEVELOPMENT

Not Applicable.

TECHNICAL FIELD

This invention relates to CANOpen networks having a master device and at least one discrete I/O device, and more particularly, to a method and apparatus for determining the state of the discrete I/O device.

BACKGROUND OF THE INVENTION

The CANOpen network is well known. Typically the CANOpen network includes an intelligent master device and a plurality of I/O modules (slave devices) coupled to a serial communications bus. Typically a CANOpen network includes a plurality of analog I/O modules as well as a plurality of discrete (on/off) I/O modules. Current methods for transmitting data from the I/O modules to the master device are either: (1) timed data transmissions from each of the I/O modules to the master device; (2) random, change-of-state transmissions from the I/O modules to the master device any time the state of one of the I/O modules changed; or (3) timed requests from the master device to each of the I/O modules.

In the first two of these methods, it is impossible to insure that the peak volume of the messages will not overload the master device. This can prevent the master device from processing all of the messages, and thus, messages can be missed. While the third method solves the problem of peak loading, it does not insure that the network is operating at its maximum capacity.

The CANOpen network was originally developed for automobiles, where the number of I/O points, and bus length, are known and relatively limited. For this purpose, the CANOpen network, with the above described limitations, operated satisfactorily.

However, there has been a desire to utilize CANOpen networks in industrial control, where greater flexibility in the number of I/O modules and bus length are required. In these situations, the above described limitations have proven to be a problem.

The present invention is provided to solve these and other problems.

SUMMARY OF THE INVENTION

For a CANOpen network including a bus master and an I/O module, each communicatively coupled to a common bus, wherein the I/O module is subject to a state change, it is an object of the invention to provide a method of permitting the bus master to collect state information from the discrete I/O module.

In accordance with the invention, the method comprises determining if the bus master is prepared to receive further data from the bus, sending a trigger signal from the bus master to the I/O module if the bus master is prepared to receive further data from the bus, and sending a state signal from the I/O module to the bus master in response to the trigger signal.

It is contemplated that the network may include a plurality of I/O modules, each communicatively coupled to the common bus, wherein each of the I/O modules is subject to a state change, and that the method comprises sending a trigger signal from the bus master to a selected one of the I/O modules and sending a state signal from the selected I/O module to the bus master in response to the trigger signal.

It is further contemplated that the method comprises configuring a plurality of the I/O modules as a group, sending a trigger signal from the bus master to a selected group of the I/O modules, and sending a state signal from each I/O module of the selected group of I/O modules to the bus master in response to the trigger signal. The group of I/O modules may be less than the total plurality of I/O modules.

It is a further object of the invention to provide a CANOpen network comprising a bus master, an I/O module subject to state changes, and a common bus communicatively coupling the bus master and the I/O module, wherein the bus master includes means for sending a trigger signal from the bus master to the I/O module when the bus master is prepared to receive further data from the bus, and the I/O module includes means for sending a state signal from the I/O module to the bus master in response to the trigger signal to permit the bus master to collect state information from the I/O module.

It is contemplated that the network comprises a plurality of I/O modules. Each of the I/O modules is communicatively coupled to the common bus. Each of the I/O modules is subject to a state change and the bus master includes means for sending a trigger to a selected one of the I/O modules. The I/O modules include means for sending a state signal from the selected I/O module to the bus master in response to the trigger signal.

It is further contemplated that a plurality of the I/O modules are configured as a group, the bus master includes means for sending a trigger signal from the bus master to a selected group of the I/O modules, and each of the I/O modules in the selected group includes means for sending a state signal from each I/O module of the selected group to the bus master in response to the trigger signal. The group of I/O modules is less than the total plurality of I/O modules.

For a CANOpen network including a bus master and an I/O module, each communicatively coupled to a common bus, wherein the I/O module is subject to a state change, it is a further object of the invention to provide a computer readable medium containing program instructions for execution by the bus master to cause the bus master to perform steps for collecting state information from the I/O module.

In accordance with this aspect of the invention, the method comprises selectively sending a trigger signal from the bus master to the I/O module and collecting a state signal from the I/O module sent by the I/O module in response to the trigger signal.

These and other aspects and attributes of the present invention will be discussed with reference to the following drawings and accompanying specification.

DETAILED DESCRIPTION OF THE INVENTION

Figure 1:
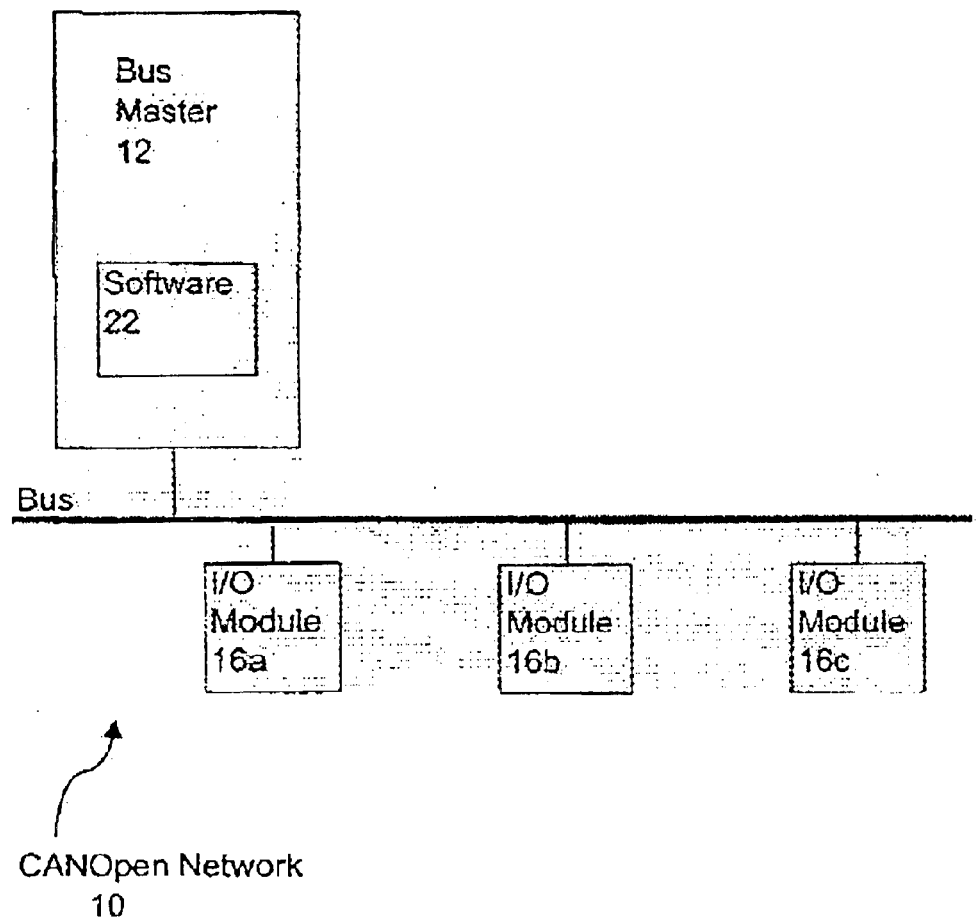
FIG. 1 is a block diagram of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A CANOpen network 10 is illustrated in FIG. 1. The network 10 includes a bus master 12. The bus master 12 may be a field bus coupler, a PLC (programmable logic controller) or such other intelligent master device.

The network 10 further includes a plurality of I/O modules 16. The I/O modules may be analog I/O devices 16*a*, high priority discrete (on/off) I/O modules 16*b* or low priority discrete (on/off) I/O modules 16*c*. A bus 20 communicatively couples the bus master 12 and each of the I/O modules 16.

The discrete I/O modules 16*b*, 16*c* are subject to state changes. The high priority discrete I/O modules 16*b* each include software control for placing a change-of-state signal on the bus 20 to be communicated to the bus master 12 in response to a state change of the respective high priority discrete I/O module 16*b*. Thus only the high priority change-of state signals will be placed on the bus 20, thus minimizing bus traffic.

Each of the I/O modules 16 (analog or discrete) on the bus 20 will also place their respective data on the bus 20 in response to a respective, unique trigger signal. The bus master 12 includes trigger software control 22 for selectively sending a selected trigger signal from the bus master 12 on to the bus 20. The trigger signal is received by a selected one of the of I/O modules 16 (analog or discrete), to poll the selected I/O module 16 for its data. Thus the bus master 12 is able to selectively poll the I/O modules 16, depending upon the relative priority of their data, again minimizing bus traffic.

The bus master 12 issues a trigger signal once it has sufficiently processed incoming messages, so that it is able to receive and process additional messages. This prevents bus overload and insures that all incoming messages, and in particular incoming change-of-state messages from the high priority discrete I/O modules 16*b*, are received and processed.

Some or all of the I/O modules 16 may be configured as a group, or groups, of I/O modules 16. Accordingly, the group of I/O modules would collectively respond to a group trigger signal.

This configuration allows performance approaching the theoretical maximum for high priority messages, while retaining the deterministic characteristics of a triggered protocol.

In an alternative embodiment, none of the discrete I/O modules 16 independently place a change-of-state signal on the bus 20. Rather, the I/O modules 16 only respond to respective trigger signals.

As with the first embodiment, the bus master 12 issues a trigger signal once it has sufficiently processed incoming messages, so that it is able to receive and process additional messages.

The particular embodiment used in a given situation depends on various factors, such as the quantity of high priority messages and the volume of data flow on the bus 20.

While the specific embodiments have been illustrated and described, numerous modifications come to mind without significantly departing from the spirit of the invention and the scope of protection is only limited by the scope of the accompanying claims.

We claim:

1. For a CANOpen network including a bus master and an I/O module, each communicatively coupled to a common bus, wherein the I/O module is subject to a state change, a method of permitting the bus master to collect state information from the I/O module, the method comprising:

determining if the bus master is prepared to receive further data from the bus;

sending a trigger signal from the bus master to the I/O module if the bus master is prepared to receive further data from the bus; and sending a state signal from the I/O module to the bus master in response to the trigger signal.

2. The method of claim 1 including a plurality or I/O modules, each communicatively coupled to the common bus, wherein each of the I/O modules is subject to a state change, the method comprising:

determining if the bus master is prepared to receive further data from the bus;

sending a trigger signal from the bus master to a selected one of the I/O modules if the bus master is prepared to receive further data from the bus; and sending a state signal from the selected I/O module to the bus master in response to the trigger signal.

3. The method of claim 2 comprising:

configuring a plurality of the I/O modules as a group;

determining if the bus master is prepared to receive further data from the bus;

sending a trigger signal from the bus master to a selected group of the I/O modules if the bus master is prepared to receive further data from the bus; and sending a state signal from each I/O module of the selected group of I/O modules to the bus master in response to the trigger signal.

4. The method of claim 3 wherein the group of I/O modules is less than the total plurality of I/O modules.

5. For a CANOpen network including a bus master and a plurality of I/O modules, each communicatively coupled to a common bus, wherein the plurality of I/O modules are configured as a plurality of groups of I/O modules, and each of the I/O modules is subject to a state change, a method of permitting the bus master to collect state information from a selected group of I/O modules, the method comprising:

determining if the bus master is prepared to receive further data from the bus;

sending a trigger signal from the bus master to the selected group of I/O modules if the bus master is prepared to receive further data from the bus; and sending a state signal from each of the I/O modules in the selected group to the bus master in response to the trigger signal.

6. A CANOpen network comprising:

a bus master;

an I/O module subject to state changes;

a common bus communicatively coupling the bus master and the I/O module, wherein the bus master includes means for sending a trigger signal from the bus master to the I/O module when the bus master is prepared to receive further data from the bus, and the I/O module includes means for sending a state signal from the I/O module to the bus master in response to the trigger signal to permit the bus master to collect state information from the I/O module.

7. The network of claim 6 including a plurality of I/O modules, each communicatively coupled to the common bus, wherein each of the I/O modules is subject to a state change, wherein the bus master includes means for sending a trigger to a selected one of the I/O modules when the bus master is prepared to receive further data from the bus, and the I/O modules include means for sending a state signal from the selected I/O module to the bus master in response to the trigger signal.

8. The network of claim 7, wherein:

a plurality of the I/O modules are configured as a group:

the bus master includes means for sending a trigger signal from the bus master to a selected group of the I/O modules when the bus master is prepared to receive further data from the bus; and each of the I/O modules in the selected group includes means for sending a state signal from each I/O module of the selected group to the bus master in response to the trigger signal.

9. The network of claim 8 wherein the group of I/O modules is less than the total plurality of I/O modules.

10. A CANOpen network comprising:

a bus master;

a plurality of I/O modules subject to state changes, wherein the plurality of I/O modules are configured as a plurality of groups of I/O modules, and a bus communicatively coupling the bus master and each of the I/O modules, wherein the bus master includes means for sending a trigger signal from the bus master to a selected group of I/O modules when the bus master is prepared to receive further data from the bus; and the each of the I/O modules in the selected group includes means for sending a state signal from each of the I/O modules in the selected group to the bus master in response to the trigger signal.

11. For a CANOpen network including a bus master and an I/O module, each communicatively coupled to a common bus, wherein the I/O module is subject to a state change, a computer readable medium containing program instructions for execution by the bus master to cause the bus master to perform steps for collecting state information from the I/O module, the method comprising:

selectively sending a trigger signal from the bus master to the I/O module; and collecting a state signal from the I/O module sent by the I/O module in response to the trigger signal.

12. For a CANOpen network including a bus master and a plurality of I/O modules, each communicatively coupled to a common bus, wherein the plurality of I/O modules are configured as a plurality of groups of I/O modules, and each of the I/O modules is subject to a state change, a computer readable medium containing program instructions for execution by the bus master to cause the bus master to perform steps for collecting state information from a selected group of I/O modules, the method comprising:

determining if the bus master is prepared to receive further data from the bus;

sending a trigger signal from the bus master to the selected group of I/O modules if the bus master is prepared to receive further data from the bus; and collecting a state signal from each of the I/O modules in the selected group sent by the I/O modules in the selected group in response to the trigger signal.

* * * * *